United States Patent
Joshi et al.

(10) Patent No.: US 7,523,393 B2
(45) Date of Patent: *Apr. 21, 2009

(54) DYNAMICALLY UPDATING RENDERED CONTENT

(75) Inventors: Niraj P. Joshi, Cary, NC (US); Robert C. Leah, Cary, NC (US); Paul F. McMahan, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/829,734

(22) Filed: Jul. 27, 2007

(65) Prior Publication Data

US 2007/0271332 A1     Nov. 22, 2007

Related U.S. Application Data

(63) Continuation of application No. 10/383,306, filed on Mar. 7, 2003, now Pat. No. 7,299,409.

(51) Int. Cl.
*G06F 17/00* (2006.01)

(52) U.S. Cl. .................. 715/234; 715/200; 715/201; 715/202; 715/203; 715/204; 715/235; 715/236; 715/237; 715/238; 715/239; 715/240; 715/241; 715/242; 715/255; 715/716

(58) Field of Classification Search ......... 715/200–204, 715/234–242, 255, 716
See application file for complete search history.

(56) References Cited

U.S. PATENT DOCUMENTS

| | | | |
|---|---|---|---|
| 6,452,609 B1 | 9/2002 | Katinsky et al. | |
| 7,043,525 B2 | 5/2006 | Tuttle et al. | |
| 7,117,436 B1 | 10/2006 | O'Rourke et al. | |
| 7,316,003 B1 * | 1/2008 | Dulepet et al. | 717/111 |
| 2002/0065899 A1 * | 5/2002 | Smith et al. | 709/214 |
| 2002/0073149 A1 | 6/2002 | Young | |

(Continued)

OTHER PUBLICATIONS

IBM Tivoli Service Level Advisor V1.1 Helps Enable Improved Service Level Management, Apr. 9, 2002, IBM United States Software Announcement 202-086, pp. 1-3 of 7.

(Continued)

*Primary Examiner*—Stephen S Hong
*Assistant Examiner*—David Faber
(74) *Attorney, Agent, or Firm*—Marcia L. Doubet (57) ABSTRACT

Techniques are disclosed for efficiently updating rendered content (such as content of a Web page) using a "slow-loading" content element, such as a slow-loading image. A reference is embedded within the markup language notation for the content to be rendered, where this reference identifies the source of the slow-loading content element. Delivery of the slow-loading content therefore begins automatically, when the content is rendered. Event handling attributes are specified with the reference, where values of these attributes identify client-side logic to be invoked when the associated event occurs. If the server determines that the rendered content, or some portion thereof, should be asynchronously updated, it abruptly terminates delivery of the slow-loading content. This termination triggers an event handler, which operates to automatically request reloading of the content. Attributes are also preferably specified for handling abort events and successful loading events, causing the client to request reloading of the content in each case (and restarting delivery of the slow-loading content).

5 Claims, 5 Drawing Sheets

U.S. PATENT DOCUMENTS

| | | |
|---|---|---|
| 2002/0107945 A1 | 8/2002 | George et al. |
| 2002/0152239 A1 | 10/2002 | Bautista-Lloyd et al. |
| 2003/0021282 A1 | 1/2003 | Hospodor |

OTHER PUBLICATIONS

Van Den Broecke, Just, Pushlets-Whitepaper, Aug. 6, 2002, Just Objects B.V., Feb. 24, 2003, <http://www.pushlets.com/doc/whitepaper-all.html>, pp. 1-21.

Moncur, Sams Teach Yourself JavaScript in 24 Hours, Third Edition, Jun. 7, 2002, Sams, 3rd, pp. 1-6.

McGlashan, Dialog Requirements for Voice Markup Languages, Dec. 23, 1999, W3C, pp. 1-13, <http://www.w3.org/TR/voice-dialog-reqs/>.

Hoque, JavaScript Event Handlers, Jun. 24, 2001, Intranet Journal, pp. 1-5, <http://web.archive.org/web/20010624080710://www.intranetjournal.com/corner/hoque/eh-1.shtml>.

The Perfect Storm Media Page, The Perfect Storm, Oct. 2, 2002, Warner Brothers, pp. 1-3, <http://web.archive.org/web/20021002201647/http://perfectstorm.warnerbros.com/cmp/video.html>.

Real.com, Error #29, Jan. 27, 2002, Real Networks, pp. 1-2, <http://web.archive.org/web/20020127101206/http://service.real.com/help/errors/error29.html>.

Microsoft, Microsoft Computer Dictionary Fifth Edition, Microsoft, 2002, Fifth Edition, pp. 1-4.

JavaScript Kit, Understand "event handlers" in JavaScript, Jun. 11, 2002, JavaScript Kit, pp. 1-2.

The American Heritage College Dictionary, 2002, Houghton Mifflin, Fourth Edition, pp. 1-4.

* cited by examiner

```
410
<img src="http://server/DynamicUpdateServlet"
420 onError="window.location.reload()"
430 onAbort="window.location.reload()"
440 onLoad="window.location.reload()"
450 width="0"
460 height="0"/>
```

DYNAMICALLY UPDATING RENDERED CONTENT

CROSS REFERNCE TO RELATED PATENT APPLICATIONS

This application is a continuation of U.S. patent application Ser. No. 10/383,306, filed Mar. 7, 2003, now U.S. Pat. No. 7,299,409, entitled "Dynamically Updating Rendered Content", the subject matter of which is hereby incorporated by reference in its entirety.

BACKGROUND OF THE INVENTION

1. Field of the Invention

The present invention relates to computer software, and deals more particularly with techniques for efficiently updating rendered content (such as content of a Web page) using a "slow-loading" content element (e.g., a slow-loading image).

2. Description of the Related Art

The popularity of computer networking environments has increased tremendously in recent years, due in large part to growing business and consumer use of the public Internet and the subset thereof known as the "World Wide Web" (or simply "Web"). Other types of computer networking environments, such as corporate intranets and extranets, are also increasingly popular. As solutions providers focus on delivering improved Web-based computing, many of the solutions which are developed are adaptable to other computer networking environments. Thus, references herein to the Internet and Web are for purposes of illustration and not of limitation. (Furthermore, the terms "Internet", "Web", and "World Wide Web" are used interchangeably herein.)

Most modern computing applications render their displayable output using a graphical user interface, or "GUI". In a computer networking environment such as the Internet, client software known as a "browser" is typically responsible for requesting content from a server application and for rendering the information sent by the server in response. Commonly, the rendered information is formatted as a Web page, where the layout of the Web page is defined using a markup language such as Hypertext Markup Language ("HTML"). (References herein to rendered content are in terms of displayed HTML Web pages, although this is by way of illustration and not of limitation.)

Many client/server applications that operate in computer networking environments need to asynchronously update a GUI displayed on the client, based on (for example) some change in the server. Examples of this type of application include system monitoring applications such as Tivoli Business Systems Manager and Tivoli Enterprise Console® (which may need to asynchronously display alert notifications to a system administrator); messaging/chat applications such as Lotus Sametime® (e.g., to display an indication of which people on the user's instant messaging buddy list are currently available for instant messaging); and so forth. ("Tivoli Enterprise Console" is a registered trademark of International Business Machines Corporation and "Sametime" is a registered trademark of Lotus Development Corporation.)

In the prior art, applications that need to asynchronously update a displayed GUI at a client typically use one of the following techniques to perform the update:

1) The client binds to a socket address and listens for connections from the server. In this approach, the client starts a listening thread attached to a socket. When an update occurs, the server creates a connection to the port where the client is listening, delivers the update notification, and then disconnects.

2) The client polls the server. In this approach, the client connects to the server periodically to check for updates, and then disconnects until the next polling interval. Typically, client polling results in downloading content without regard to whether it has been updated.

3) The client maintains a persistent connection to the server. Here, the client connects to the server and "subscribes" to be notified of updates. When an update occurs, the server sends an update notification over this already-existing connection.

Figure 1:
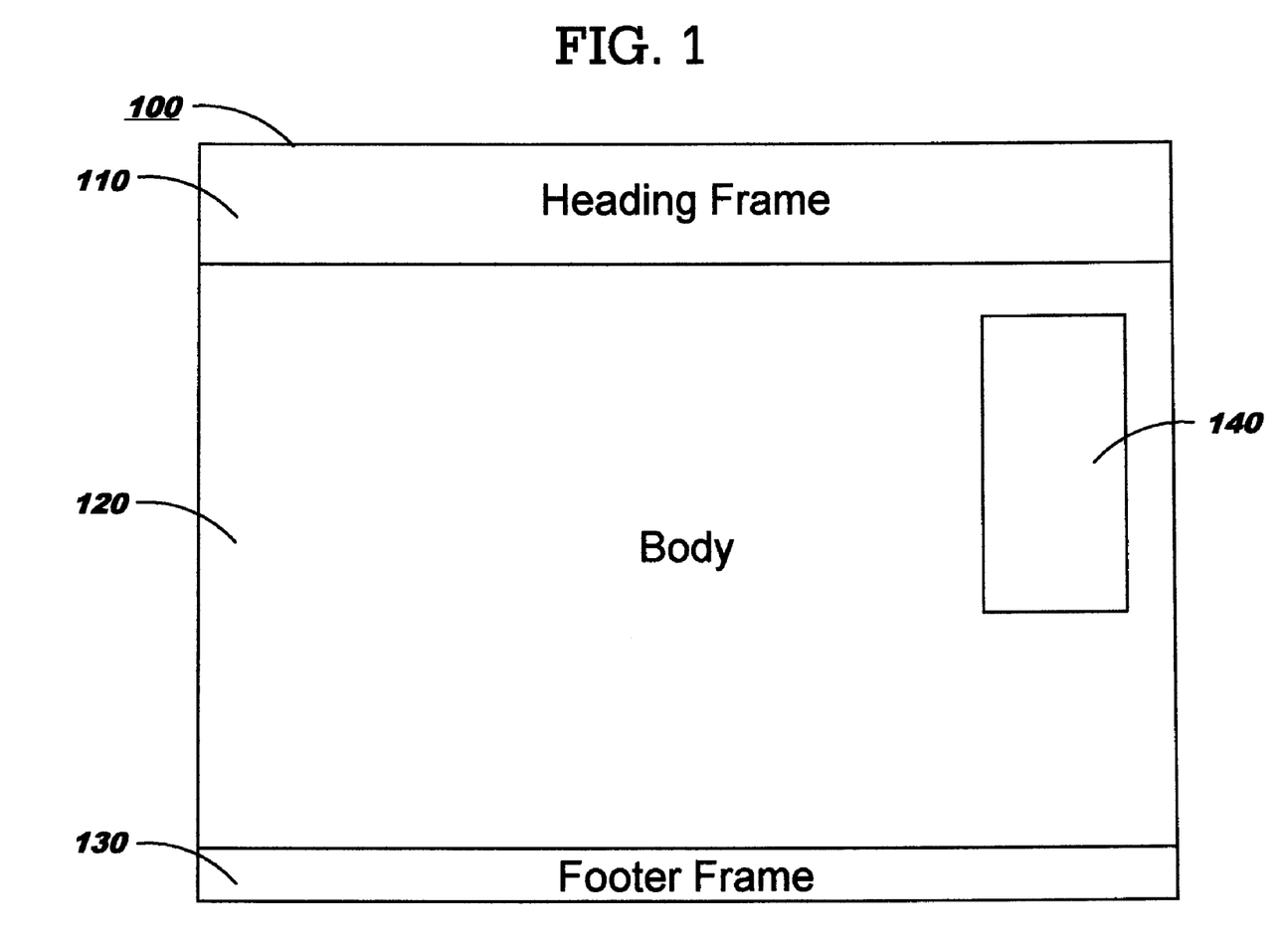
FIG. 1 provides a sample Web page layout that includes a frame for rendering dynamic content, where the present invention provides improvements over prior art techniques for rendering content in this frame.

When the client application is a Web interface (e.g., HTML displayed in a Web browser), there is still often a need to asynchronously update the client's displayed GUI. Examples of such scenarios include any application where at least some portion of the content delivered to the client for rendering via the Web interface is dynamic in nature—such as stock ticker feeds, weather forecasts, etc. (as well as Web versions of the previously-described monitoring and chat scenarios). FIG. 1 shows a sample Web page layout 100 that has a header 110, body 120, and footer 130. In addition, a dynamic content area 140 is rendered in the upper right portion of the display. This dynamic content area 140 may be structured as a frame within page 100, and might be used to display a stock ticker with stocks the user wants to monitor, or the current temperature in the user's location, and so forth. However, the techniques described above for asynchronously updating a GUI display become much more problematic and difficult to implement in the Web environment, largely because the underlying technologies (the Hypertext Transport Protocol used for message delivery, the HTML notation, and the JavaScript® scripting language, in particular) don't readily facilitate these types of interactions. ("JavaScript" is a registered trademark of Sun Microsystems, Inc.)

It is not possible to use the first technique listed above (where the client listens for server connections) without introducing a Java™ applet, and using an applet in this way is often not possible since an applet that performs this type of privileged operation would require a cryptographic signature on the applet as well a hole in the client's firewall. When using the second technique listed above (where the client polls the server), a great deal of unnecessary network traffic can be generated, and the server can easily get overloaded. Client polling can also cause the GUI to flicker, and can interrupt the user's interactions with the Web page (since the page is suddenly and abruptly refreshed). These disadvantages often make the third technique listed above (use of a persistent connection) the most attractive. ("Java" is a trademark of Sun Microsystems, Inc.)

A commonly-used implementation of the third technique is a technology known as "pushlets". Pushlets basically use an HTML frame to display the client's HTML and a hidden HTML frame to maintain a persistent connection to a servlet. The connection remains persistent because the servlet never closes the output stream of the HttpServletResponse that is destined for the hidden frame. Instead, the servlet holds onto this output stream and whenever a client update is needed, the server sends JavaScript commands to the hidden frame, where this JavaScript contains the updated HTML. A JavaScript listener function in the hidden frame receives the JavaScript commands, and uses Dynamic HTML ("DHTML") to replace the contents of the visible frame accordingly. Refer to "Pushlets-Whitepaper", by Just van den Broecke, published Aug. 6, 2002 by Just Objects B. V. on the Internet at http:// www.pushlets.com/doc/whitepaper-all.html for more information on pushlet technology.

However, there are several problems with pushlets, several of which are described in the above-referenced white paper on pushlets. These problems include:

1) Interference from content buffering. The HTTP framework was not designed for persistent connections, so the content of an HTTP response is often buffered by some component of the network. Buffering may be introduced by an HTTP proxy server, network cache, or even the servlet engine's HTTP server. This buffering can delay the client update, or even prevent it altogether.

2) No reconnect mechanism is available. Again, since the HTTP framework was not designed for persistent connections, the HTTP server and/or client often terminate an HTTP request if it has been running for too long. It is also possible for the user to accidentally (or purposefully) terminate the persistent HTTP request by pressing the "Escape" key or the "Stop" button. When the HTTP request ends in this way, the client has no way to automatically reconnect the persistent connection to the server, or to signal the user that he has caused a disconnect.

3) Client memory leaks may occur. When using pushlets, the hidden frame is receiving new HTML strings to display in the visible frame. These HTML strings become part of the JavaScript that is contained in the hidden frame's Document Object Model ("DOM"). The browser will not free memory associated with a DOM until the page containing that DOM is reloaded. Since the hidden frame is not reloaded, the memory footprint of the browser can grow without bounds. (Hereinafter, the terms "refresh", "redraw", and "reload" are used synonymously when referring to redisplaying content.)

4) Cross-browser issues with DHTML support. While a standard version of DHTML is promulgated by the World Wide Web Consortium ("W3C"), different browser vendors have provided their own unique extensions. These vendor-specific extensions complicate efforts to deploy pushlets uniformly across all browser platforms.

Accordingly, what is needed are improved techniques for asynchronously updating rendered content, while avoiding drawbacks of prior art approaches.

SUMMARY OF THE INVENTION

An object of the present invention is to provide improved techniques for asynchronously updating rendered content.

Another object of the present invention is to define techniques for more efficiently refreshing Web page content.

Still another object of the present invention is to define techniques for leveraging existing Web-based components to dynamically update a rendered Web page.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides software-implemented methods, systems, and computer program products for asynchronously reloading dynamically-updateable content such as a Web page. In one aspect of preferred embodiments, this technique comprises: embedding a reference to slow-loading content into markup notation for a Web page to be rendered; and specifying, with the reference, one or more event handlers that will automatically reload content into the Web page upon occurrence of corresponding events. The reference to slow-loading content may be an image element, an audio element, a video element, or other similar element encoded in the markup language notation. The event handlers may be specified as attributes of the element. The markup language may be HTML or another markup language.

Typically, the automatically reloaded content is to be loaded into a dynamically-updateable portion of the Web page, and the Web page will be rendered on a client, according to its markup notation, causing delivery of the referenced slow-loading content to begin (from a server that is connected to the client by a connection over a network).

The technique may further comprise: subsequently detecting, by the server, that the dynamically-updateable portion of the Web page should be updated; and terminating, by the server, the delivery of the slow-loading content, responsive to the detection, thereby triggering a corresponding event handler at the client.

Or, the technique may further comprise: subsequently detecting one of the events at the client (including interruption in delivery of the slow-loading content, a network error, a user interrupting delivery of the slow-loading content, or completion of delivery of the slow-loading content); and automatically triggering, by the client responsive to the subsequent detection, a corresponding event handler at the client.

In any case, the triggering of the event handler preferably further comprises automatically invoking, on the client, scripting logic that requests reloading the dynamically-updateable portion of the Web page. The technique may further comprise: receiving the reload request at the server; delivering, from the server to the client, a response containing new content that is responsive to the reload request, wherein the new content also embeds a reference to slow-loading content and specifies one or more event handlers; and rendering the new content from the delivered response at the client, wherein the rendering automatically sends a new request to the server for delivering the slow-loading content referenced in this new content.

Optionally, application properties and/or network properties may be used to adjust generation of the requested slow-loading content before returning the generated slow-loading content over the network to the client.

In another aspect of preferred embodiments, the technique comprises: embedding a reference to slow-loading content into markup notation for content that is to be rendered, wherein at least a portion of the content to be rendered is dynamically-updateable; and specifying, with the reference, one or more event handlers that will automatically reload content into the dynamically-update portion of the rendered content upon occurrence of corresponding events. This technique may further comprise rendering the content on a target device, according to its markup notation, and beginning delivery of the referenced slow-loading content from a server that is communicatively connected to the target device. Preferably, the technique further comprises: subsequently detecting, at the client, that one of the events has occurred; and automatically requesting, by the corresponding event handler, that the slow-loading content be reloaded.

The target device may be (for example) a kiosk having a dynamically-updateable display, a device that provides a Web console having a dynamically-updateable display, or a device that renders information for a Web application.

The disclosed techniques may also be used advantageously in methods of doing business, whereby a service is offered to customers for delivering the slow-loading content elements on which preferred embodiments are based, and/or for deploying markup language content that invokes delivery of these slow-loading content elements. This service may be provided under various revenue models, such as pay-per-use billing, monthly or other periodic billing, and so forth. The advantages offered to clients over prior art techniques include more efficiently-refreshed content, more timely content, and/or reduced network traffic.

The present invention will now be described with reference to the following drawings, in which like reference numbers denote the same element throughout.

DESCRIPTION OF PREFERRED EMBODIMENTS

Figure 2:
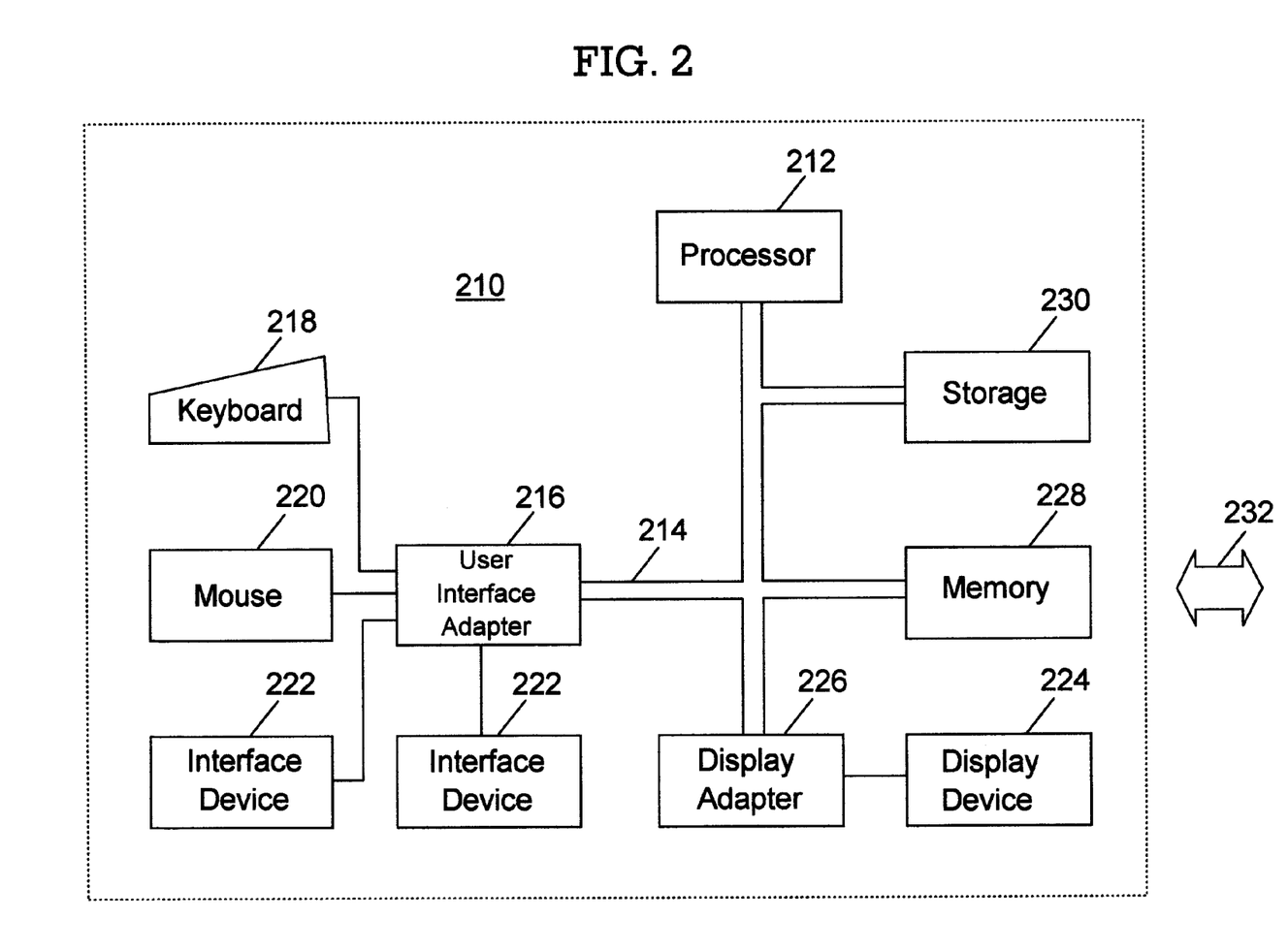
FIG. 2 is a block diagram of a computer hardware environment in which the present invention may be practiced.

FIG. 2 illustrates a representative computer hardware environment in which the present invention may be practiced. For example, on the client side of a network connection, techniques of preferred embodiments may operate in a representative single user computer workstation 210, such as a personal computer, which typically includes a number of related peripheral devices. The workstation 210 includes a microprocessor 212 and a bus 214 employed to connect and enable communication between the microprocessor 212 and the components of the workstation 210 in accordance with known techniques. The workstation 210 typically includes a user interface adapter 216, which connects the microprocessor 212 via the bus 214 to one or more interface devices, such as a keyboard 218, mouse 220, and/or other interface devices 222, which can be any user interface device, such as a touch sensitive screen, digitized entry pad, etc. The bus 214 also connects a display device 224, such as an LCD screen or monitor, to the microprocessor 212 via a display adapter 226. The bus 214 also connects the microprocessor 212 to memory 228 and long-term storage 230 which can include a hard drive, diskette drive, tape drive, etc.

The workstation 210 may communicate with other computers or networks of computers, for example via a communications channel or modem 232. Alternatively, the workstation 210 may communicate using a wireless interface at 232, such as a cellular digital packet data ("CDPD") card. The workstation 210 may be associated with such other computers in a local area network ("LAN") or a wide area network ("WAN"), or the workstation 210 can be a client in a client/server arrangement with another computer, etc. All of these configurations, as well as the appropriate communications hardware and software, are known in the art.

Figure 3:
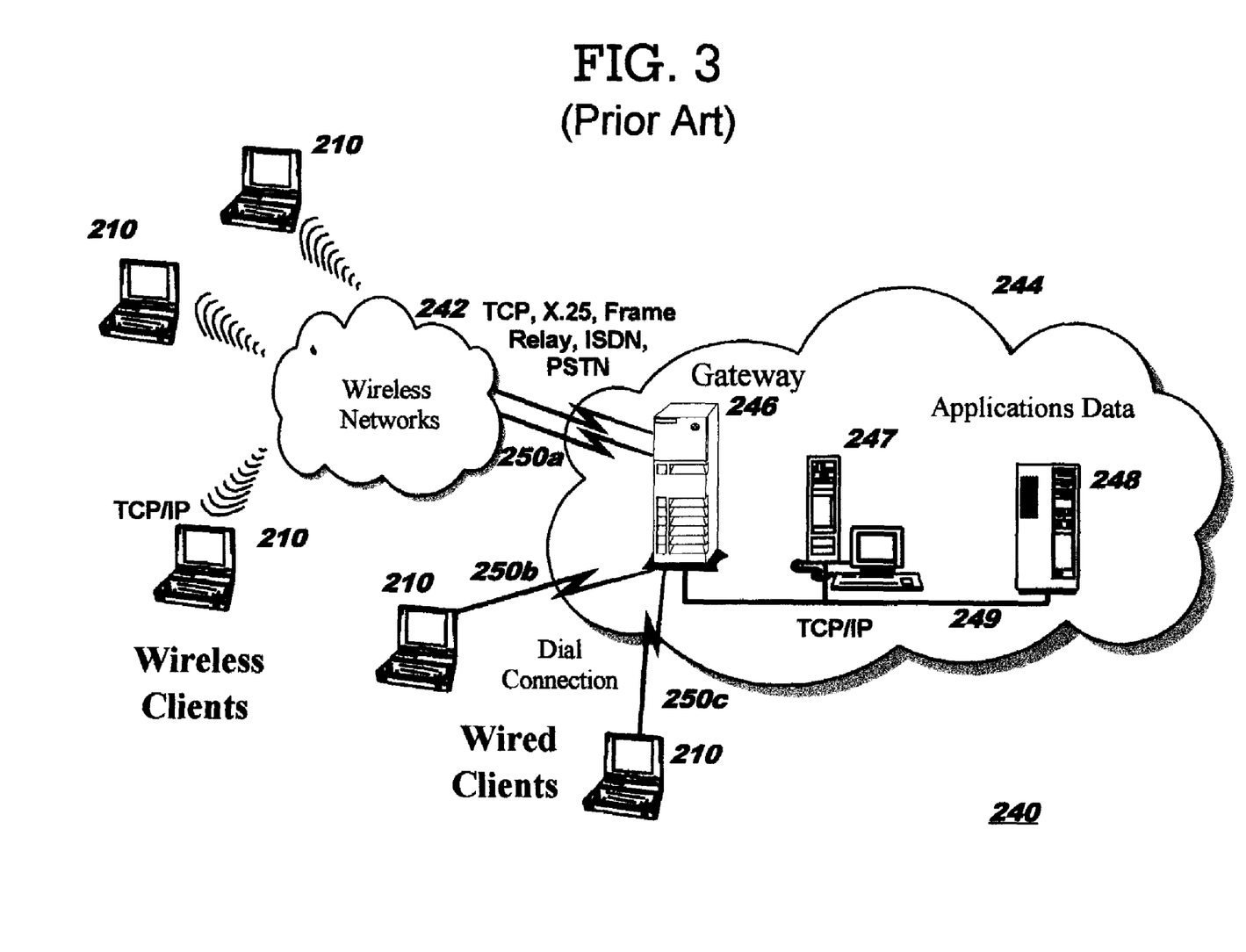
FIG. 3 is a diagram of a networked computing environment in which the present invention may be practiced.

FIG. 3 illustrates a data processing network 240 in which the present invention may be practiced. The data processing network 240 may include a plurality of individual networks, such as wireless network 242 and network 244, each of which may include a plurality of individual workstations 210. Additionally, as those skilled in the art will appreciate, one or more LANs may be included (not shown), where a LAN may comprise a plurality of intelligent workstations coupled to a host processor.

Still referring to FIG. 3, the networks 242 and 244 may also include mainframe computers or servers, such as a gateway computer 246 or server 247 (which may access a data repository 248). Server 247 may be an application server or an HTTP server. A gateway computer 246 serves as a point of entry into each network 244. The gateway 46 may be preferably coupled to another network 242 by means of a communications link 250a. The gateway 246 may also be directly coupled to one or more workstations 210 using a communications link 250b, 250c. The gateway computer 46 may be implemented utilizing an Enterprise Systems Architecture/370™ available from the International Business Machines Corporation ("IBM®"), an Enterprise Systems Architecture/390® computer, etc. Depending on the application, a midrange computer, such as an Application System/400® (also known as an AS/400®) may be employed. ("Enterprise Systems Architecture/370" is a trademark of IBM; "IBM", "Enterprise Systems Architecture/390", "Application System/400", and "AS/400" are registered trademarks of IBM.)

The gateway computer 246 and/or server 247 may also be coupled 249 to a storage device (such as data repository 248). Further, the gateway 246 may be directly or indirectly coupled to one or more workstations 210. The server 247, when functioning as an HTTP server, preferably carries out server-side processing of the present invention. (Alternatively, the server-side processing described herein may be performed on an application server, provided that server also functions as an HTTP server.)

Those skilled in the art will appreciate that the gateway computer 246 may be located a great geographic distance from the network 242, and similarly, the workstations 210 may be located a substantial distance from the networks 242 and 244. For example, the network 242 may be located in California, while the gateway 246 may be located in Texas, and one or more of the workstations 210 may be located in Florida. The workstations 210 may connect to the wireless network 242 using a networking protocol such as the Transmission Control Protocol/Internet Protocol ("TCP/IP") over a number of alternative connection media, such as cellular phone, radio frequency networks, satellite networks, etc. The wireless network 242 preferably connects to the gateway 246 using a network connection 250a such as TCP or User Datagram Protocol ("UDP") over IP, X.25, Frame Relay, Integrated Services Digital Network ("ISDN"), Public Switched Telephone Network ("PSTN"), etc. The workstations 210 may alternatively connect directly to the gateway 246 using dial connections 250b or 250c. Further, the wireless network 242 and network 244 may connect to one or more other networks (not shown), in an analogous manner to that depicted in FIG. 3.

Software programming code which embodies the present invention is typically accessed by the microprocessor 212 of the server 247 from long-term storage media 230 of some type, such as a CD-ROM drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory 228, and accessed by the microprocessor 212 using the bus 214. The techniques and methods for embodying software programming code in memory, on physical media, and/or distributing software code via networks are well known and will not be further discussed herein. (Note that software operating on a workstation 210 participates in the present invention, but preferred embodiments of the present invention leverage functionality already present in browsers, as will be discussed below.)

The computing environment in which the present invention may be used includes an Internet environment, an intranet environment, an extranet environment, or any other type of networking environment. These environments may be structured in various ways, including a client-server architecture or a multi-tiered architecture. The scope of the present invention also includes a disconnected (i.e. stand-alone) environment, whereby page content is created that will (upon its use at run-time in a networking environment) invoke delivery of slow-loading content elements as disclosed herein (and where this created page content will be transmitted in a networking environment, but may initially be transmitted on media such as diskettes).

When used in a networking environment, a user of the present invention (e.g., an end user who will receive dynamically-updated page content) may connect his computer to a server using a wireline connection or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld, or mobile computers; vehicle-mounted devices; desktop computers; mainframe computers; personal digital assistants ("PDAs"); Web-enabled cellular phones; Web appliances; wearable computing devices; so-called "smart" appliances in the home; etc., having processing (and optionally communication) capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

In preferred embodiments, the present invention is implemented as one or more computer software programs. Preferably, the software operates on a server, where this server connects to clients across a network. The server may be functioning as a Web server, where that Web server provides services in response to requests from a client connected through the Internet. Alternatively, the server may be in a corporate intranet or extranet of which the client's workstation is a component, or in any other networking environment.

The present invention provides novel techniques for efficiently refreshing content displayed in a Web page (or a similar window that displays content according to a markup language such as HTML). Existing Web-based components are leveraged in the dynamic, asynchronous content updating techniques disclosed herein. Advantages of the present invention can therefore be realized with minimal expense and without requiring the deployment of additional software products (which is especially beneficial from the perspective of the client-side workstations).

According to the present invention, a special content element is included in the markup language specification of Web content (referred to herein as an HTML page, for purposes of illustration but not of limitation) that needs to be dynamically updated. This content element is an image element in preferred embodiments (where this image element is designed to be slow-loading), and thus references hereinafter are to an "image element". (Alternative embodiments may use other types of content elements without deviating from the scope of the present invention, such as audio or video content elements.) The purpose of this image element is to slowly transmit content to the client browser, thereby keeping a (relatively long-running) connection open between the client and server. This slow transmission is not used to actually display an image in the browser: instead, the connection it keeps open is used to automatically initiate content refreshes when needed. Therefore, the content of the transmitted slow-loading image (or other slow-loading content element) is immaterial.

Figure 4:
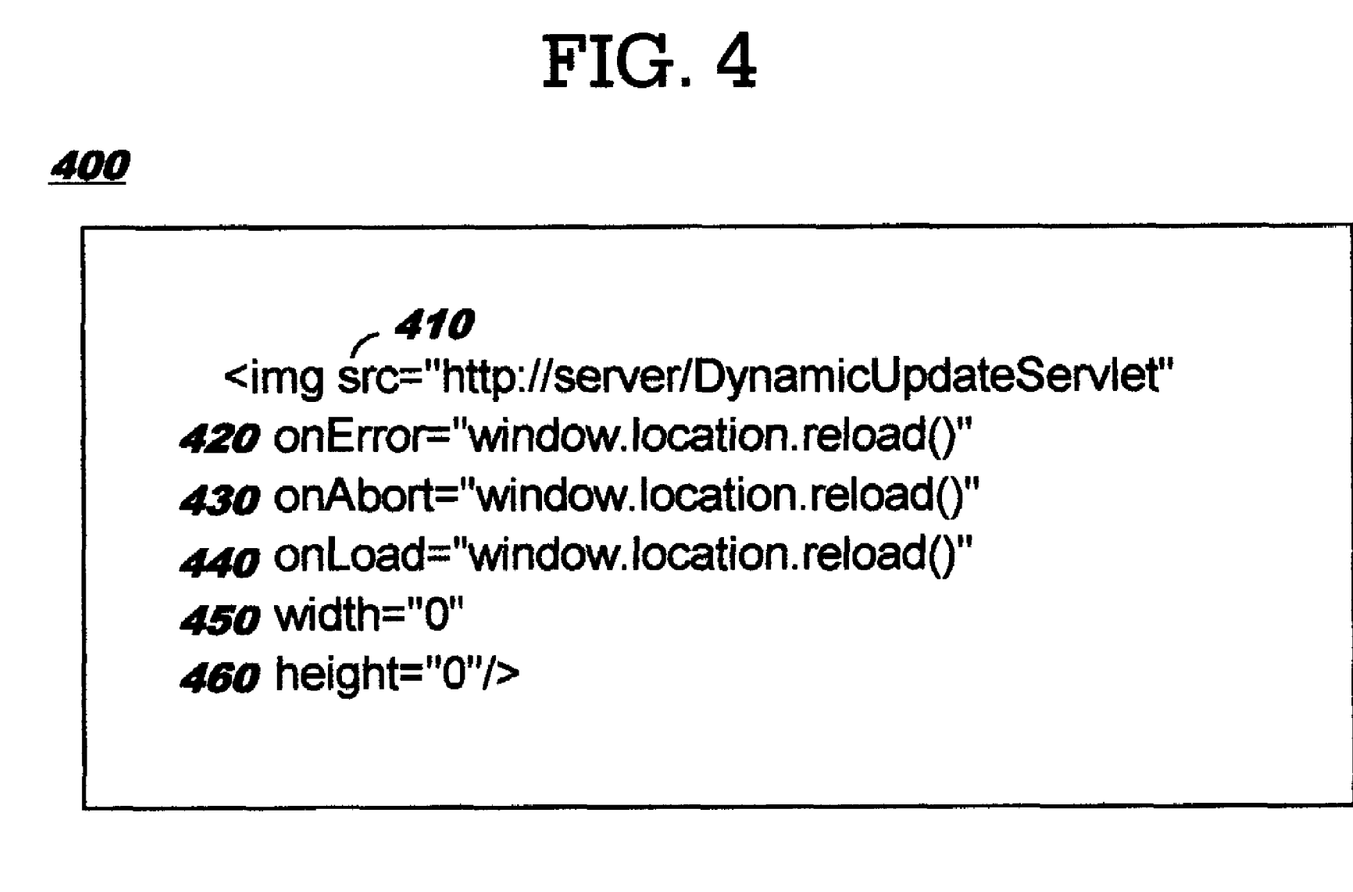
FIG. 4 illustrates syntax used for dynamic content refreshes, according to the present invention.

According to preferred embodiments, the markup syntax for the slow-loading image element is generated as in the example syntax 400 shown in FIG. 4 (which may appear within HTML markup for a Web page). This syntax is included in a Web page for which dynamic content is to be asynchronously delivered. The attributes for this image element used in preferred embodiments will now be described with reference to the sample attribute values in FIG. 4.

A "src" attribute 410 on the image element specifies a Uniform Resource Locator ("URL"), and according to standard image-element processing, instructs the browser to download the image from the specified URL ("http://server/DynamicUpdateServlet", in the example). According to preferred embodiments, the URL points to a server-side logic (such as a servlet) that slowly returns the bytes for an image, while monitoring a status indicator (such as a binary flag or binary-valued property) referred to herein as a "dirty bit". This dirty bit corresponds to the GUI that is currently displayed in the web browser. When the servlet detects that the GUI needs to be refreshed (i.e., the dirty bit is set), the servlet will abruptly close the output stream on the HttpServletResponse. This abrupt closure automatically triggers a page reload, according to standard processing in the browser, because the client's "onError" JavaScript listener will be called (as discussed with reference to the "onError" attribute, below). Once the content has been refreshed, its dirty bit is preferably reset (indicating that there is currently no revised version of this content that needs to be delivered to the client).

It should be noted that while preferred embodiments are described herein with reference to server-side logic implemented as a servlet, this is for purposes of illustration but not of limitation. The actual server-side technology is immaterial, provided the server-side functionality described herein is supported (including delivery of the slow-loading content, etc.). Alternatives to servlets include Active Server Pages ("ASPs"), Dynamic Server Pages ("DSPs"), Perl scripts, Common Gateway Interface ("CGI") scripts, an operating system executable program running on the server, and so forth.

An "onError" attribute 420 of the image element is used, and instructs the browser to reload the page when the image's "onError" event is fired. The "onError" event is fired when the server terminates the HTTP response before the image has fully loaded (and in particular, when the server terminates the response because it detects that the dirty bit has been set). This event may also be fired if other types of errors occur (as discussed with reference to Block 525 of FIG. 5, below). In the example of FIG. 4, the value of the "onError" attribute is "window.location.reload( )", which instructs the JavaScript listener to request a reload of the window containing the (hidden) image, and all of its contents. The dynamic content is therefore automatically refreshed. (Alternatively, the entire top-most frame or window may be reloaded, if desired. However, preferred embodiments reload only the dynamic content frame to avoid drawbacks of the prior art, including excessive network traffic and frame flicker.)

An "onAbort" attribute 430 is specified for the image element, and instructs the browser to reload the page when the image's "onAbort" event is fired. The "onAbort" event is fired when the user presses the Escape key or presses the browser's Stop button.

An "onLoad" attribute 440 specified for the image element instructs the browser to reload the page when the image's "onLoad" event is fired. The "onLoad" event is fired when the image has finished loading. It is important for the server to periodically finish sending the image object to the browser, so that a memory leak is avoided. (Thus, the image will periodically finish its transmission, the storage allocated to it in the DOM will be freed, and the image will then begin to load again automatically due to firing this "onLoad" event.)

Note that the firing of the "onError", "onAbort", and "onLoad" events occurs according to standard processing in the browser, and the page reloading that results from the listener's processing these events is also according to standard processing. Preferred embodiments of the present invention therefore do not require additional client-side functionality.

The "width" and "height" attributes 450, 460 of the image element are preferably set to zero. Therefore, when the browser renders this HTML, the image element does not actually appear in the GUI.

Figure 5:
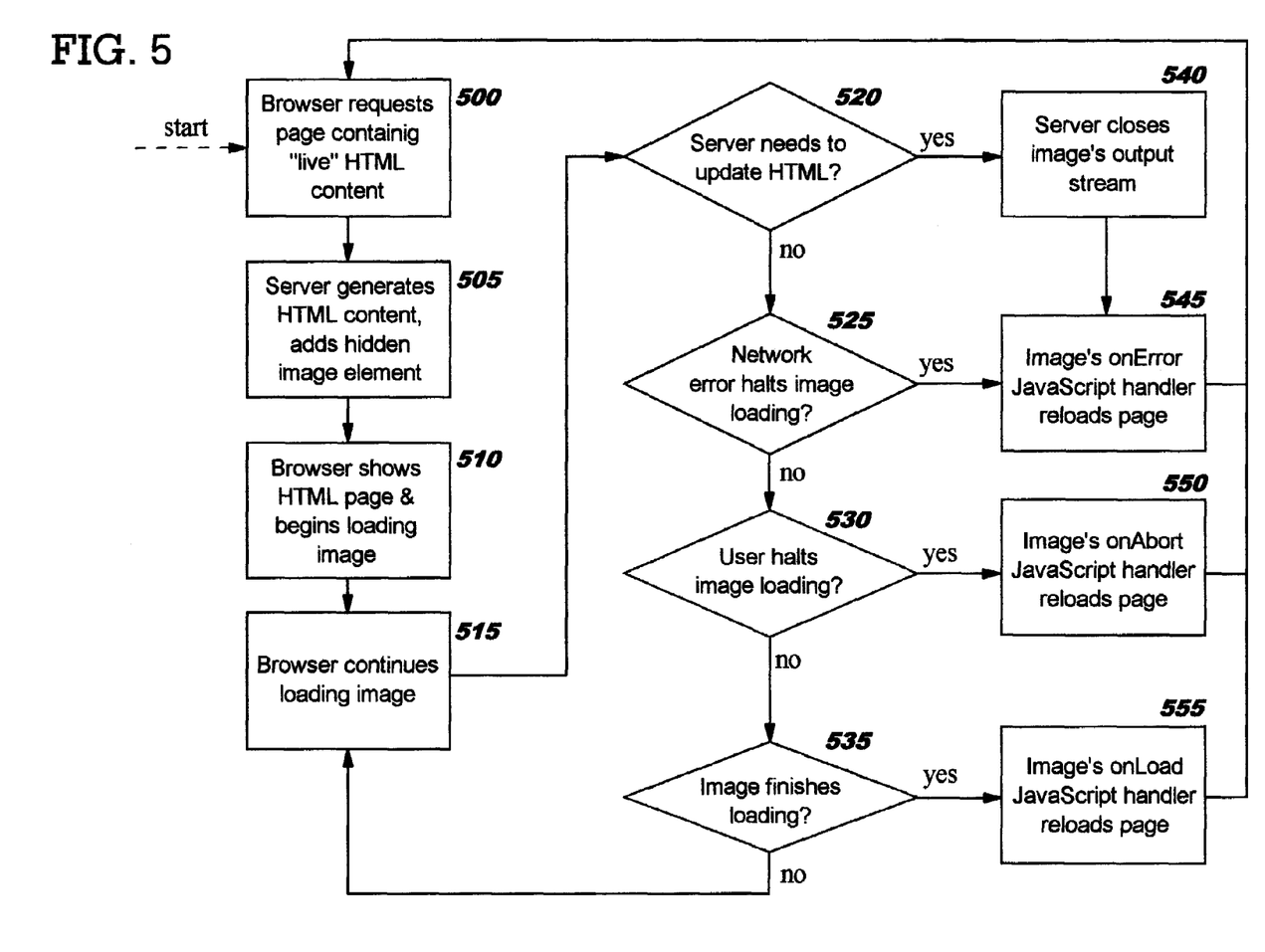
FIG. 5 provides a flow chart that sets forth logic which may be used to implement a preferred embodiment of the present invention.

Referring now to FIG. 5, logic which may be used to implement preferred embodiments will now be described. The processing begins at Block 500, where the client's browser requests a Web page that has been designed to include some type of "live" (i.e., asynchronously-updateable) content. (Note that the browser, and the end user, need not be aware that this requested Web page contains this type of content.) The server responds (Block 505) with content that is generated according to the present invention, thereby including an image element for slow-loading, hidden content as described with reference to the syntax in FIG. 4.

When the browser receives this content, it renders the Web page (Block 510) and automatically begins to load the slow-loading image. As noted in Block 515, the image continues to load for some period of time (thereby keeping open a connection between the client and server). Block 520 represents a test made on the server side of the network, checking the dirty bit to see if the server needs to update the content of the currently-displayed page. When this test has a positive result, processing continues to Block 540, where the server closes the output stream over which the image is being sent. The browser will then detect that the stream was closed, and will fire an "onError" event (Block 545). This event is handled by the JavaScript handler named in the "onError" attribute, as discussed above with reference to FIG. 4, and therefore a page (re)load request is automatically sent from the client to the server (as shown in FIG. 5 by transferring control back to Block 500). The processing of this reloaded page proceeds through the logic of FIG. 5 in an analogous manner to that of the originally-loaded page.

When the test in Block 520 has a negative result, a test is made (Block 525) to see if a network error of some type has halted the loading of the image. For example, the connection between the client and server may have accidentally dropped. When this test has a positive result, the "onError" event is fired, causing the browser to request a (re)load of the page (as described with reference to Blocks 545 and 500).

If the test in Block 525 has a negative result, then it may happen that the user has halted the image loading. This condition is checked in Block 530 (representing processing on the client side). If the loading was halted by the user, the "onAbort" event will be fired (Block 550), and the JavaScript listener for that event will cause the browser to issue a new request for the page (Block 500).

If none of the tests in Blocks 520, 525, or 530 has a positive result, then Block 535 checks to see if the image has finished loading successfully. As noted above, the image delivery is preferably designed such that this will periodically occur, in order to avoid memory leaks. Thus, when the loading finishes, the image's "on Load" event will be fired (Block 555), and the JavaScript listener will cause the browser to issue a request for (re)loading the page (Block 500).

If the image has not yet finished loading, but no errors are fired, the test in Block 535 has a negative result, and control transfers from Block 535 to Block 515, indicating that the delivery of the slow-loading image continues. If available, a timer-driven delay may be interposed between the processing of Blocks 535 and 515 to reduce processing overhead.

Optionally, the parameters used when generating the slow-loading content may be optimized or adjusted based on properties of the application and/or network. For example, one or more of the following parameters might be adjusted in the server-side logic that generates a slow-loading image: (1) the image size (i.e., number of bytes); (2) the image chunk size (i.e., how many bytes are sent at a time); (3) the image transmission rate (e.g., number of bytes transmitted per second); (4) the image format (e.g., selecting "jpeg" format vs. "gif" format, and so forth); etc. Setting the image chunk size may be especially beneficial when the maximum buffer size of all network components (e.g., proxy, firewall, etc.) between the client and server is known. It may be used to set the chunk size to a minimum value that will ensure end-to-end content delivery.

In alternative embodiments, the techniques described herein may be used with markup languages other than HTML, and as noted above, other types of slow-loading content elements may be used in place of image elements. Alternative markup languages include the Extensible Markup Language ("XML"), Wireless Markup Language ("WML"), other derivatives of the Standard Generalized Markup Language ("SGML"), etc., provided the markup language supports client-side scripting and exposes attributes such as the onLoad, onError, and onAbort attributes of a markup tag as described herein. For example, in a hypothetical markup language "myML" that allows an <audio> tag, the syntax in FIG. 4 might be replaced by the following example syntax:

```
<audio src = "http://hostname/DynamicUpdateServlet"
    onError = "window.location.reload( )" ... />
```

The slow-loading content may be any objects (such as images) of different Multipurpose Internet Mail Extension ("MIME") types.

In addition to using the present invention for asynchronously updating Web application content displayed on a user's workstation GUI, the techniques disclosed herein may be used in other environments, including (but not limited to) Web consoles and kiosks.

As has been demonstrated, the dynamic content refreshing approach of the present invention operates efficiently and avoids drawbacks of prior art techniques. For example, the present invention uses bandwidth more efficiently than prior art page reloading techniques because it does not use client-driven polling, and the disclosed techniques avoid the unnecessary flashing or flickering of browser frames that occurs with prior art approaches. No additional client-side logic is required, beyond existing browser support for JavaScript (or an analogous client-side scripting technique).

This asynchronous update technique may be used to refresh content that is updated as a result of daemons or other server-side processing that occurs in application-specific ways.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor, or other programmable data processing apparatus to produce a machine, such that the instructions (which execute via the processor of the computer or other programmable data processing apparatus) create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While preferred embodiments of the present invention have been described, additional variations and modifications in those embodiments may occur to those skilled in the art once they learn of the basic inventive concepts. The techniques disclosed herein are based partially upon certain pre-defined characteristics of the notations being processed. It will be obvious to one of ordinary skill in the art that the inventive concepts disclosed herein may be adapted to changes in the notations, should they occur. Furthermore, while preferred embodiments are described with reference to JavaScript and HTML, this is intended to encompass similar types of scripting components and similar markup languages.

Therefore, it is intended that the appended claims shall be construed to include both the preferred embodiments and all such variations and modifications as fall within the spirit and scope of the invention.

The invention claimed is:

1. A computer-implemented system for asynchronously reloading Web page content from a server to a client in a computer networking environment, comprising a processor and a memory coupled thereto, the memory storing instructions configured to:

respond to receiving, at the server from the client over a first network connection, a request for displayable Web page content to display on a display device coupled to the client, at least a portion of the displayable Web page content comprising dynamic content, by:
generating the requested displayable Web page content using markup language notation and embedding, in the markup language notation, a reference to a stored image, wherein the reference specifies that the stored image is to be rendered with a height of zero and a width of zero and that the client is to automatically re-issue a request for the stored image if the client detects an error condition during loading of the stored image; and
sending the generated Web page content and the embedded reference from the server to the client over the first network connection, the reference configured to cause the client to automatically issue a request, without input from a user of the client, for the stored image upon rendering the markup language notation and detecting the embedded reference therein;

respond to receiving, at the server from the client over a second network connection, a request for the stored image by starting delivery of the stored image from the server to the client over the second network connection, the stored image sized as to require relatively longer transmission time, from the server to the client over the second network connection, as compared to transmission time for the sending of the generated Web page content over the first network connection;

detect, by the server without input from the client or the user, that the displayable Web page content that was sent to the client over the first network connection needs to be updated;

update the displayable Web page content and close the second network connection, by the server responsive to the detection, while the stored image is still being delivered to the client over the second network connection, thereby causing the client to detect the error condition and to automatically respond to the detected error condition by sending a new request for reloading of the displayable Web page content; and respond to receiving, at the server from the client, the new request from the client by repeating the generating and the sending, wherein the generating uses the updated Web page content.

2. The system according to claim 1, wherein:
the reference that specifies that the stored image is to be rendered with a height of zero and a width of zero and that the client is to automatically re-issue the request for the stored image if the client detects the error condition further comprises a specification, in syntax of the reference, of an event handler for responding to the error condition.

3. The system according to claim 1, wherein the reference further specifies that the client is to automatically re-issue the request for the stored image if the client detects that the user has halted the delivery of the stored image.

4. The system according to claim 1, wherein the reference further specifies that the client is to automatically re-issue the request for the stored image if the client detects completion of the delivery of the stored image.

5. A computer-implemented system for asynchronously reloading dynamically-updateable content from a server to a client in a computer networking environment, comprising a processor and a memory coupled thereto, the memory storing instructions configured to:

respond to receiving, at the server from the client over a first network connection, a request for displayable content that is to be rendered on a display device coupled to the client, wherein at least a portion of the displayable content to be rendered is dynamically-updateable, by:

generating the requested displayable content using markup language notation and embedding, in the markup language notation, a reference to a stored image, wherein the reference specifies that the stored image is to be rendered with a height of zero and a width of zero and that the client is to automatically re-issue a request for the stored image if the client detects an error condition during loading of the stored image; and sending the generated content and the embedded reference from the server to the client over the first network connection, the reference configured to cause the client to automatically issue a request, without input from a user of the client, for the stored image upon rendering the markup language notation and detecting the embedded reference therein;

respond to receiving, at the server from the client over a second network connection, a request for the stored image by starting delivery of the stored image from the server to the client over the second network connection, the stored image sized as to require relatively longer transmission time, from the server to the client over the second network connection, as compared to transmission time for the sending of the generated content over the first network connection;

detect, by the server without input from the client or the user, that the displayable content that was sent to the client over the first network connection needs to be updated;

update the displayable content and close the second network connection, by the server responsive to the detection, while the stored image is still being delivered to the client over the second network connection, thereby causing the client to detect the error condition and to automatically respond to the detected error condition by sending a new request for reloading of the displayable content; and respond to receiving, at the server from the client, the new request by repeating the generating and the sending, wherein the generating uses the updated content.

* * * * *